UNITED STATES PATENT OFFICE.

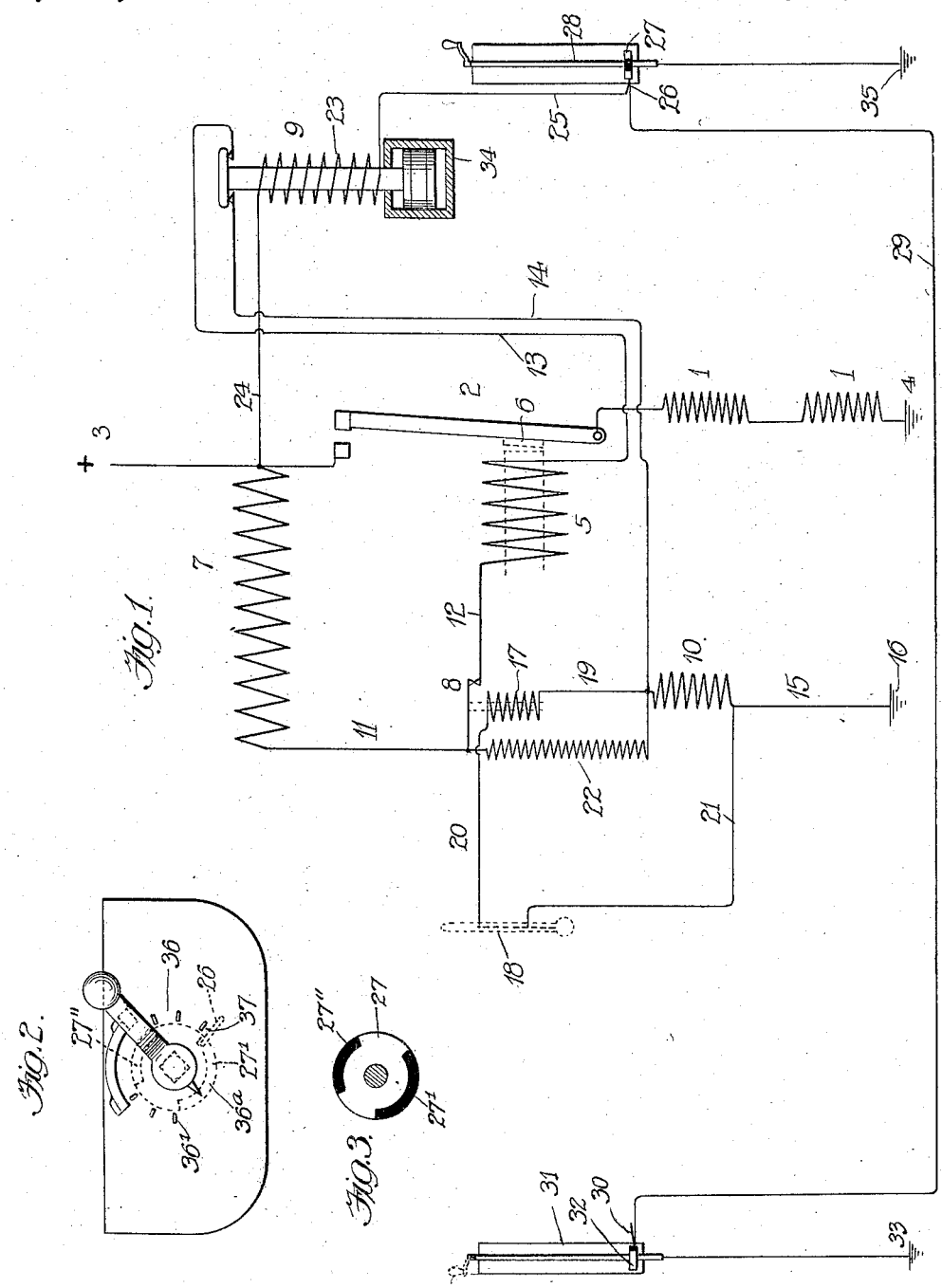

LEE P. HYNES, OF CHICAGO, ILLINOIS, ASSIGNOR TO RAILWAY UTILITY COMPANY, OF CHICAGO, ILLINOIS, A CORPORATION OF ILLINOIS.

ELECTRIC-HEATING SYSTEM.

1,150,939.      Specification of Letters Patent.      Patented Aug. 24, 1915.

Application filed January 12, 1914. Serial No. 811,530.

*To all whom it may concern:*

Be it known that I, LEE P. HYNES, a citizen of the United States, residing at Chicago, in the county of Cook and State of Illinois, have invented certain new and useful Improvements in Electric-Heating Systems, of which the following is a specification.

My invention relates more particularly to such systems for heating electrically propelled cars and which are controlled by a thermostat to cut out the heaters when the temperature rises above a predetermined point and to cut them in when the temperature again falls below such point. I have found that the most delicate and accurate form of thermostat for this work is what is known as a thermometer-thermostat embodying a bulb and column of mercury as in the ordinary thermometer, the instrument, however, being provided with a pair of contacts, one of which is constantly in touch with the mercury of the thermostat and the other of which is arranged at the critical point at which it is desired to switch the current through the heaters on and off. The difficulty which has hitherto been encountered in the employment of this form of thermostat in heating systems is that it is not adapted to carry a large current without injury thereto due principally to sparking or arcing as the contact is broken.

It is one of the objects of the present invention to obviate this difficulty by passing only a small current through the thermostat at any time and reducing the current to an exceedingly feeble one at the time the contact is broken.

A further object of the present invention is to reduce the "peak of the load" or maximum burden put upon the generator by operating the car. For the purpose I have provided automatic means by which the heating current is cut out during the periods when the motors of the car are consuming larger amounts of energy and cut in only when the motors are consuming lesser amounts of current, providing that at the same time the temperature of the car is such as to require additional heat.

In the accompanying drawings I have shown a preferred system for carrying out my invention to accomplish the above objects, but it is to be understood that the specific disclosure is for the purpose of exemplification only and that the invention is set forth in the following claims in which I have endeavored to distinguish it from the prior art so far as known to me, without, however, abandoning any portion or feature thereof. I have not considered it necessary to show the actual construction of many of the various mechanisms included in the system since they are *per se* all well-known in the art and various forms thereof found on the market are well adapted to my purpose.

In the accompanying drawings Figure 1 is a diagram of my improved heating system; Fig. 2 a plan view of a motorman's controller equipped with a device forming an element of my improved system, the latter shown in dotted lines, and Fig. 3 a cross-section of the controller equipped with said device.

Referring now to the diagram, the heaters 1, 1 may be of any suitable form and capacity and are connected in series as usual, a contactor 2 of approved form being adapted to close the circuit therethrough when the temperature of the car demands additional heat. I have indicated at 3 the connection to service and at 4 the grounding of the heating circuit. The contactor 2 is controlled by an electromagnetic coil 5 which is in shunt to the contactor and heaters and when energized attracts its armature 6 and closes the heating circuit. A high resistance 7, say of four thousand ohms is included in the circuit of said coil which is normally closed by a relay 8, controlled in a manner to be presently described, at temperatures below that at which it is designed to maintain the atmosphere of the car. A cutout 9 and a resistance 10, the nature and purpose of which will appear later, are also included in this circuit which may be traced from service at 3, through resistance 7, conductor 11, relay 8, conductor 12, coil 5, conductor 13, the contacts of cutout 9, conductor 14, resistance 10 and conductor 15 to ground at 16.

The circuit through the coil 17 of the relay 8 is controlled by the thermometer-thermostat 18 and is in shunt to the resistance 10 which may be of approximately three hundred ohms to supply the required voltage to operate the relay. The thermostat circuit when closed may be traced from one terminal of the resistance 10 through conductor 19, coil 17, conductor 20, the thermostat 18 and conductor 21 to the other terminal of the resistance 10. The latter is so chosen with respect to the other resistances of the circuit in which it is included that with the voltages normally employed in traction work a current sufficient to operate the relay but not sufficient to injure the thermostat flows through these devices when the circuit is closed. As heretofore stated, the construction of relay 8 is such that energization of coil 17 results in the opening of the contacts of said relay, whereby the current through the contactor coil 5 is broken and the latter permits the heating circuit to open, this action occurring whenever the temperature is sufficient to close the circuit through the thermostat.

The opening of the circuit by the relay 8, unless provision were made to the contrary, would obviously deprive the relay coil of current which would permit the relay contacts to close again and the opening and closing actions would continue indefinitely causing a chattering of the relay. To obviate this action I provide a shunt about the relay contacts and contactor coil in which I include a high resistance 22 which may be of approximately fifteen thousand ohms whereby a small current flows through the circuit including the coil 10 and consequently a current very feeble even as compared to the actuating current flows through the relay coil 17 which, while it would be insufficient to operate said relay, is yet sufficient to maintain it in opened position. This enfeebling of the current through the thermostat circuit at this stage is particularly of advantage in that it reduces any tendency to arc or spark in the thermostat when the current is broken by the recession of the column of mercury. Obviously when the temperature falls the thermostat breaks the circuit through the coil 17 of relay 8 and the latter thereupon closes the circuit through the contactor coil which again attracts its armature closing the heating circuit.

In order to reduce as far as possible the "peak of the load" upon the generator due to the operation of the car, I provide means for cutting out the heating coils when the motors of the car are putting their largest load upon the generator even though at the time the temperature of the car does demand the cutting in of the heaters. This feature of my invention will be readily understood by referring to the usual operation of the motorman's controller commonly employed for the motor circuit. In starting, the motors of the car which are usually two in number are in series and simultaneously with the closing of the circuit the maximum resistance available is thrown in to prevent the destruction of the motors. As the car accelerates the handle of the controller is swung in a direction to cut out element after element of the resistance until all of the resistance is eliminated from the circuit, the motors being still in series. If it is not desired to run the car at high speed this condition is maintained. If, however, greater speed is desired the motors are thrown into multiple which would double the current through each except that simultaneously therewith the maximum resistance is again thrown in. As the speed of the car accelerates and the counter-electromotive force of the motor rises, the resistance is again gradually eliminated by further swinging the handle of the controller. Such is the ordinary method of controlling the motors of electric cars. In order that the heating load may not be put upon the generator during the periods of acceleration when the motor load is greatest, I provide the cutout 9 before mentioned which is controlled by the motorman's controller. The movable member of the cutout 9 is controlled by a coil 23 connected to service by a conductor 24 and to ground, the circuit being controlled by the motorman's controller or where there are two controllers the circuit is under the control of both. For this purpose the coil 23 is connected by a wire 25 with a stationary contact finger 26 which is in contact with a metal disk 27 upon the shaft 28 of the controller which latter is grounded in any suitable manner as at 35. The disk 27 is provided on its periphery with insulating sections 27' 27'', corresponding in position to the arcs of the controller's movement in which the car is not being accelerated but in which the motor circuit is either open or has a minimum load.

In Figs. 2 and 3 of the drawing I have shown diagrammatically the arrangement of the insulating strips 27' and 27'' upon the disk with relation to the various positions of the controller handle, the disk 27 appearing in dotted lines in Fig. 2 and in full lines in Fig. 3. In the former figure the handle is shown in the position that it occupies when the motor circuit is open. At this time the contact finger 26 rests upon one of the insulating strips 27' so that there is no current through the coil 23 and the circuit is closed through the contacts of the cutout 9. In this condition, as before noted, the current through the heating coils is off or on accordingly as the temperature in the car is above or below a predetermined point. When, however, the handle begins to move over the arc 36 to throw in the motors and resistance and progressively cut the latter out, the insulating strip on the disk 27 is moved away from the contact finger 26 and the latter then bears upon the metal portion of the disk 27 and so closes the circuit through the coil 23 and the cutout is actuated to open the circuit through the coil 5 which controls the contactor 2 of the heating circuit. The conducting portion of the disk edge is of a length sufficient to cut out the heating current as long as the handle is passing over the arc 36 and until it reaches the intermediate arc 36ª where, as before stated, the acceleration of the car has substantially ceased and the load upon the motors has become relatively slight. At this point the second insulating strip 27″ comes opposite to the finger 26 and again cuts out the current through the coil 23 permitting the cutout 9 to close and again restoring entire control of the heating system to the thermostat. Thus it will be seen that I have provided for relieving the generators of the heating load during the period that the motor load is greatest while at the same time regulating the heating circuit by the temperature in the car. With this construction whenever the car is being started or accelerated a current will flow through the coil 23, conductor 25, contact 26, disk 27 and controller 28 to the ground, thereby raising the cutout 9 and opening the circuit through the contactor coil and hence opening the heating circuit. When, however, the car is stationary or the motors cut out for any other reason or when the car is running at constant speed there will be no current through the coil 23 and the cutout 9 will be closed thus closing the heating circuit except in so far as it may be kept open by the thermostat as above described. In case there are two controllers, of course, the circuit through that one which is not in use will be open and the action of the wheel 23 will be controlled by the other circuit. In the diagram I have shown a connection from the contact 26 through wire 29 to stationary contact 30 of another controller 31. The disk 32 is substantially like that previously described and is connected to ground at 33.

In running cars at low speed as in the midst of crowded city traffic the motorman customarily constantly manipulates the controller handle to throw the current on and off. With the construction as so far described this would also have the effect of throwing the heat controlling and heating circuits into and out of operation with an equal frequency to the injury of the contacts of the contactor. In order to avoid excessive injury thereto I provide the cutout 9 with a dashpot 34, which may be an air or liquid dashpot of any approved form, its operation, however, being sufficiently sluggish to prevent the rapid closing of the circuit through the cutout 9 in the manner above described. Thus the dashpot might be constructed to retard the closing of the circuit after it has been opened, to the extent of say ten seconds, which would substantially eliminate any trouble due to the ordinary rapid manipulation of the controller since swinging the handle to the closed position at intervals of no more than ten seconds would maintain the cutout permanently open.

I claim:

1. In a heating system for cars and the like, a heating circuit including a contactor for opening and closing the same, an electromagnetic device controlling the contactor, the coil thereof being in shunt to the heating circuit, a relay in circuit with said coil, the contacts of which are normally closed, an electromagnetic device controlling the relay contacts, the coil of which is in series with said contactor actuating coil, a shunt about said contactor coil and relay contacts, adapted to maintain a current through the relay coil when its contacts are open, and a thermostat controlling the current through said relay coil.

2. In an electric heating system, a heating circuit, a contactor for controlling the same, an electromagnetic device the coil of which is in shunt to said heating circuit and which controls said contactor, a normally closed pair of contacts in circuit with said electromagnetic device, an auxiliary electromagnetic device adapted when energized to open said contacts and in shunt to a portion of the circuit of the first named electromagnetic device, a shunt about said contacts for maintaining the flow of current when the latter are open, and a thermostat in circuit with said auxiliary electromagnetic device.

3. In an electric heating system for cars and the like, a heating circuit, a contactor for controlling the same, an electromagnetic device for maintaining the contactor closed and in shunt to the heating circuit, a pair of normally closed contacts in the circuit of said electromagnetic device, an auxiliary electromagnetic device in series with the first said electromagnetic device adapted when energized to open said contacts, a high resistance shunt about said contacts adapted to maintain a circuit through the coil of the auxiliary electromagnetic device when said contacts are open, and a thermostat for opening and closing the circuit through the coil of said auxiliary electromagnetic device.

4. In an electric heating system for electrically propelled cars and in combination with the controller of the latter, a heating circuit, a contactor for closing the same, electromagnetic means controlling the contactor, a cutout controlling current through said electromagnetic means, having a coil and a switch operated by the controller to energize the cutout coil during the periods of car acceleration and thereby to cut out the heating circuit during said periods, and a dashpot for retarding the action of the cutout.

5. In an electric heating system for electrically propelled cars and in combination with the controller of the latter, a heating circuit, a contactor controlling the same, an electromagnetic device for operating the contactor, the circuit of which is controlled by a thermostat to open said heating circuit when the temperature rises above a predetermined degree and to close it when the temperature falls below a predetermined degree, a normally closed cutout in circuit with said electromagnetic device, an electromagnetic coil for opening said cutout when energized, and a switch operated by the controller to close the circuit through the cutout controlling coil during the periods of acceleration of the car.

LEE P. HYNES.

Witnesses:
JOHN B. MACAULEY,
ROBERT DOBBERMAN.

Copies of this patent may be obtained for five cents each, by addressing the "Commissioner of Patents, Washington, D. C."